(12) United States Patent
Cohen et al.

(10) Patent No.: US 8,706,737 B2
(45) Date of Patent: Apr. 22, 2014

(54) METHOD AND APPARATUS FOR PROCESSING OF TOP-K QUERIES FROM SAMPLES

(75) Inventors: Edith Cohen, Berkeley Heights, NJ (US); Nadav Grossaug, Raanana (IL); Haim Kaplan, Hod Hasharon (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 827 days.

(21) Appl. No.: 12/347,474

(22) Filed: Dec. 31, 2008

(65) Prior Publication Data

US 2010/0169360 A1   Jul. 1, 2010

(51) Int. Cl.
  *G06F 7/00*   (2006.01)
  *G06F 17/30*  (2006.01)
  *H04L 12/24*  (2006.01)

(52) U.S. Cl.
  CPC ............ *G06F 17/3053* (2013.01); *H04L 41/12* (2013.01)
  USPC ........................................... 707/748; 709/224

(58) Field of Classification Search
  CPC ........................... G06F 17/3053; H04L 41/12
  USPC ........................................... 707/748; 709/224
  See application file for complete search history.

(56) References Cited

U.S. PATENT DOCUMENTS

| 5,600,831 | A  | * | 2/1997  | Levy et al. ............................ 1/1 |
| 5,949,678 | A  | * | 9/1999  | Wold et al. ...................... 700/83 |
| 5,987,468 | A  | * | 11/1999 | Singh et al. ........................... 1/1 |
| 6,871,201 | B2 | * | 3/2005  | Yu et al. ......................... 707/737 |
| 7,185,012 | B1 | * | 2/2007  | Koudas et al. ......................... 1/1 |
| 7,664,749 | B1 | * | 2/2010  | Koudas et al. ................ 707/753 |
| 2003/0061213 | A1 | * | 3/2003  | Yu et al. ............................. 707/7 |
| 2004/0002973 | A1 | * | 1/2004  | Chaudhuri et al. ................ 707/7 |
| 2007/0297327 | A1 | * | 12/2007 | Strom ........................... 370/230 |

OTHER PUBLICATIONS

Nadav, G., Processing Top-k Queries from Samples, School of School of Computeer Science, Tel-Aviv University, pp. 1-54, Feb. 2007.*
Cohen et al., Computer Networks, 52 (2008), pp. 2605-2622.*
Theobald et al., Proceedings of the 30th VLDB Conference, Toronto, Canada, pp. 648-659, 2004.*
Lee et al., Multimed Tools Appl (2008) 40:385-407.*
Cohen et al., Processing top-k queries from samples, Computer Networks 52 (2008) 2605-2622.*
Nicholas Bruno, et al., "Top-K Selection Queries Over Relational Database: Mapping Strategies and Performance Evaluation", Jun. 2, 2002, vol. 27, pp. 153-187.*
Nicholas Bruno, et al., "Performance of Multiattribute Top-K Queries on Relational Systems", 2000.*

* cited by examiner

*Primary Examiner* — Cheyne D Ly

(57) ABSTRACT

A method and apparatus for processing top-k queries are disclosed. For example, the method receives a top-k query with a value for a number of samples and a value of a confidence parameter. The method samples in accordance to the number of samples, and determines a top-k weight of a sample top-k set. The method bounds the top-k weight in an interval having an upper bound and a lower bound such that the top-k weight is in the interval with a probability equal to one minus the value of the confidence parameter, and provides a response to the top-k query in accordance with the upper and lower bounds.

20 Claims, 3 Drawing Sheets

METHOD AND APPARATUS FOR PROCESSING OF TOP-K QUERIES FROM SAMPLES

BACKGROUND OF THE INVENTION

The present invention relates generally to data processing and, more particularly, to a method and apparatus for providing processing of top-k queries from samples.

A network service provider may receive a request to process a Top-k query. For example, a query to perform an aggregation operation over a value of an attribute of a network data may be received. For example, the query may be to determine the top 100 packet source autonomous systems, the top 100 ports, the top domain names, and so on. If all records/data for the network can be processed, the top-k items may be obtained by counting the frequency of each item. However, the full dataset is not observable for any reasonable size network application. In addition, even if the network is small and the full dataset is available, the network resources for exhaustive data counting and analysis would be costly. Thus, top-k queries are processed from samples. However, top frequencies in a sample are biased estimates of the actual top-k frequencies wherein the bias depends on the distribution.

SUMMARY OF THE INVENTION

In one embodiment, the present invention discloses a method and apparatus for processing top-k queries. For example, the method receives a top-k query with a value for a number of samples and a value of a confidence parameter. The method samples in accordance to the number of samples, and determines a top-k weight of a sample top-k set. The method bounds the top-k weight in an interval having an upper bound and a lower bound such that the top-k weight is in the interval with a probability equal to one minus the value of the confidence parameter, and provides a response to the top-k query in accordance with the upper and lower bounds.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing processing of top-k queries from samples. Although the present invention is discussed below in the context of a packet network, e.g., an Internet Protocol (IP) network, the present invention is not so limited. Namely, the present invention can be applied for other networks such as cellular networks and the like.

Figure 1:
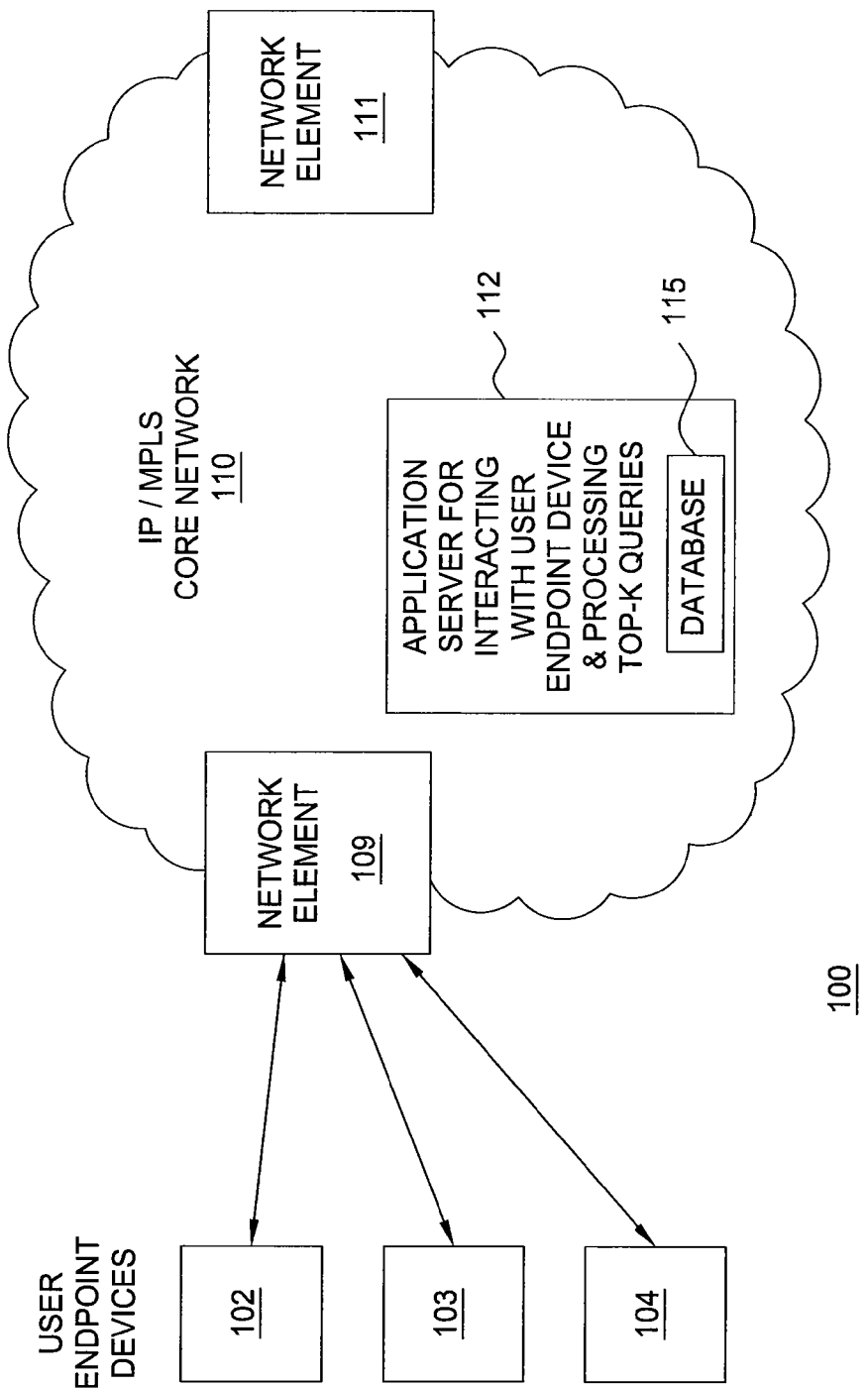
FIG. 1 illustrates an exemplary network related to the present invention.

FIG. 1 illustrates an exemplary network 100 of the current invention. In one embodiment, the packet network 100 comprises user endpoint devices 102-104 configured for communication with an Internet Protocol over Multi-Protocol Label Switched (IP/MPLS) core network 110 (e.g., an IP based core backbone network supported by a service provider). The network elements 109 and 111 serve as gateway servers or edge routers for the network 110.

The endpoint devices 102-104 may comprise customer endpoint devices such as personal computers, laptop computers, Personal Digital Assistants (PDAs), servers, routers, and the like.

The network elements (NEs) 109 and 111 reside at the edge of a core infrastructure and are typically implemented as an edge router, a media gateway, a border element, a firewall, a switch, and the like. An NE may also reside within the network and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only three user endpoint devices, two network elements, one application server, and so on are depicted in FIG. 1, the system 100 may be expanded by including additional endpoint devices, networks, network elements, application servers, without altering the scope of the present invention.

The above IP network is described to provide an illustrative environment in which packets for voice, data and multimedia services are transmitted on networks. A network service provider may receive a request from a user endpoint device to process a Top-k query. For example, a query may be sent by a user endpoint device 102, 103 or 104 to the application server 112 to perform an aggregation operation over a value of an attribute of a network data. For example, the query may be to determine the top 100 packet source autonomous systems, the top 100 ports, the top domain names, and so on. If all records/data for the network can be processed, the top-k items may be obtained by counting the frequency of each item. However, in many applications, it is not feasible to examine the whole dataset and therefore approximate query processing is performed using a random sample of the records/data.

In one example, the network data being analyzed is for an IP network. The IP traffic data is massive and highly distributed. Thus, network flow records for the IP network are collected in a distributed manner and are aggregated.

In another example, the data is gathered and the aggregation is performed over a value of an attribute. The value of the attribute used for aggregation may not be readily available, and determining the value may have an associated cost, e.g., computational resource, memory, etc. For example, the aggregation may be over a domain name that corresponds to a source or destination IP address. The domain name may then be obtained via a reverse Domain Name System (DNS) lookup performed on a sample of the data/record.

In one embodiment, the current invention provides a method and an apparatus for processing top-k queries from samples and provides confidence intervals for the resulting top-k estimates derived by processed samples. In order to clearly describe the current invention, the following definition and query processing concepts are first provided:

A top-k query;
A top-k query over an attribute; and
A proportion query.

A top-k query refers to a query for an aggregation operation on a set of data, also referred to as records.

A top-k query over an attribute refers to a query for determining the k most common values for the attribute and their corresponding frequencies (number of occurrences) over a set of data or records. For example, a top-k query may be a query to determine the top-100 Autonomous System (AS) destinations, the top-100 applications (e.g., web, p2p, other protocols), the 10 most popular Web sites, the 20 most common domain names, and so on. The query may be posed in terms of a number of IP packets (each packet is considered as a record/data), number of distinct IP flows (each distinct flow is considered a record/data), or other unit of interest.

A proportion query refers to a query for determining the frequency of a specified attribute value over a set of records or data. For example, a proportion query may be a query to estimate the fraction of IP packets or IP flows that belong to a p2p application, originate from a specific AS, originate from a specific Web site, etc. A Top-k query may be contrasted with a proportion query.

Processing an approximate proportion query from a random sample is a basic and well understood statistical problem. The fraction of sampled records with the given attribute value is an unbiased estimator, and confidence intervals are obtained using standard methods.

When the complete data set is observable, the top-k most frequent values may be computed from the frequency of each value. When only a random sample of the records is available, one method of providing an estimate for the top-k most frequent values is performing the same action on the sample. That is, obtaining the k most frequent values in the sample and proportionally scaling them to estimate the top-k frequency. This estimator, however, is biased upwards, where the expectation of the combined frequency of the top-k items in the sample is larger than the value of the combined frequency over the un-sampled records. This is a consequence of the basic statistical property that "the expectation of the maximum of a set of random variables" is greater than or equal to "the maximum of the expectations of each of said random variables." In one embodiment, the current invention accounts for this bias when deriving confidence intervals and evaluating the relationship between the sampled and the actual top-k sets. The bias depends on the fine structure of the full distribution of frequencies in the un-sampled dataset, which is not available for analysis.

In one embodiment, the current invention provides a method for processing the top-k query from a sample of the records/data, e.g., for processing the top-k query from a sampling of packet streams, distinct flows, and the like. The method provides a response to the top-k query with one or more of the following confidence intervals:

A confidence interval based on "Naive" bounds;
A confidence interval based on Cumulative Upper Bounds (CUB); or
A confidence interval based on Validation and Cross-validation bounds.

In order to provide one of the above confidence intervals, a mathematical definition of the top-k query problem is disclosed below.

Let I represent a set of items with weights $w(i) \geq 0$ for $i \in I$. Then, for $J \subset I$, denote $w(J) = \Sigma_{i \in J} w(i)$. Let, $T_i(J)$, top-i set, denote a set of the i heaviest items in J, and let $B_i(J)$, bottom-i set, denote a set of the i lightest items in J. Let also $\overline{W}_i(J) = w(T_i(J))$ denote the weight of the top-i elements in J and $\underline{W}_i(J) = w(B_i(J))$ denote the weight of the bottom-i elements in J.

In one embodiment, the method has access to weighted samples, wherein the probability of drawing an item is proportional to its weight. In the analysis and evaluation, the method normalizes the total weight of all items to 1 and uses normalized weights for all items. This is accomplished for convenience of presentation and without loss of generality.

In one embodiment, the sample weight of an item j for a set of samples S is the fraction of times it is sampled in S. The sample weight of item j is denoted by w(S, j). The sample weight of a subset J of items is defined as the sum of the sample weights of the items in J, and it is denoted by w(S, J). The sampled top-i and bottom-i sets (the i items with most/fewest samples in S) and their sampled weights are denoted by $T_i(S, J)$, $B_i(S, J)$, $\overline{W}_i(S,J) = w(T_i(S,J))$, and $\underline{W}_i(S,J) = w(BA(S,J))$, respectively.

In one embodiment, the approximate top-k problem may be defined as an estimate $\overline{W}_k(I)$, where I is the distribution from which the samples were obtained. In this embodiment, the method has access to a set S of random samples with replacements from I and a confidence parameter $\delta$. The method may then be defined as an algorithm that computes an interval [l,u] such that $l \leq \overline{W}_k(I) \leq u$ with probability $1-\delta$. This computation may be referred to as a method to approximate top-k weight.

In one embodiment, the method computes a set T of k items, and a fraction $\epsilon$ (as small as possible), such that $w(T) \geq (1-\epsilon)\overline{W}_k(I)$ with probability $1-\delta$. If absolute error is required rather than relative error then the method computes a set T of k items such that $w(T) \geq \overline{W}_k(I) - \epsilon$ with probability $1-\delta$. This computation may be referred to as a method to approximate top-k set.

Note that in the approximate top-k set problem the method does not explicitly require obtaining an estimate of w(T). However, if it can obtain such an estimate then it may also obtain good bounds on $\overline{W}_k(I)$.

The relation between these two variants is interesting. It is noted that approximating the top-k weight rather than finding an actual approximate subset is an easier problem (e.g., requiring fewer samples). As will be shown later, however, there are families of distributions on which it is much easier to obtain an approximate subset.

There are stronger versions of the approximate top-k weight problem and the approximate top-k set problem. Two of these stronger versions are: all prefix approximate; and per item approximate. The definitions for the top-k set version are provided below. The definitions for the top-k weight version are analogous.

All-prefix approximate top-k set problem refers to a problem for computation of an ordered set of k items, such that for any i=1, . . . , k, the first i items have weight that is approximately $\overline{W}_i(I)$ with probability $1-\delta$. The method may require either a small relative error or a small absolute error.

Per-item approximate top-k set problem refers to a problem for computation of an ordered set of k items, such that for any i=1, . . . , k, the ith item in the set has weight that is approximately equal to $(\overline{W}_i(I) - \overline{W}_i(I))$ (the weight of the ith heaviest item in I), with probability $1-\delta$. The method may require either a small relative error or a small absolute error.

Satisfying the stronger definitions can require substantially more samples while the weaker definitions suffice for many applications. It is therefore important to distinguish the different versions of the problem. The current invention provides algorithms for obtaining an approximate top-k weight, and some of the techniques may also be extended to other variants.

In order to mathematically define the confidence bounds, first recall the approximate top-k weight problem requires that the interval [l,u] produced by the algorithm contain the weight of $T_k(I)$, with probability $1-\delta$. That is, if the algorithm is run many times then it would be "correct" in at least $1-\delta$ fraction of its runs. The method also separately considers the two one-sided bounds on $\overline{W}_k(I)$. This holds for other versions of the problem when the method estimates other parameters. In general, the method uses the following standard statistical definitions.

The method defines u as a $1-\delta$-confidence upper bound for a parameter $\xi$ of a distribution I, if the value of $\xi$ in I is not larger than u with probability $1-\delta$. This probability is over a draw of the random samples. The method also defines $1-\delta$-confidence lower bound for $\xi$ analogously. Namely, [l,u] is a $1-\delta$-confidence interval for $\xi$, if the value of $\xi$ is not larger than u and not smaller than l with probability $1-\delta$.

If $U(\delta_1)$ is a $(1-\delta_1)$-confidence upper bound for a value and $L(\delta_2)$ is a $(1-\delta_2)$-confidence lower bound for the same value, then $(U(\delta_1)+L(\delta_2))/2 \pm (U(\delta_1)-L(\delta_2))/2$ is a $(1-\delta_1-\delta_2)$-confidence interval for the value. The quantities $\pm(U(\delta_1)-L(\delta_2))/2$ are referred to as the error bars and $(U(\delta_1)-L(\delta_2))/2$ is referred to as the estimate.

In order to define bounds for proportions, consider a sample of size s obtained for a proportion query, with $\hat{p}s$ positive samples. Let $U(h,s,\delta)$ be the largest value q such that a proportion q is at least $\delta$ likely to have at most h positive samples in a sample of size s. Then, $U(s\hat{p},s,\delta)$ is a $(1-\delta)$-confidence upper bound on the proportion p. Similarly, let $L(h,s,\delta)$ be the smallest value q such that a proportion q is at least $\delta$ likely to have at least h positive samples in a sample of size s. Then $L(s\hat{p},s,\delta)$ is a $(1-\delta)$-confidence lower bound on the proportion p.

Exact values of the bounds for proportions are defined by the standard Binomial distribution. Approximations may be obtained using Chernoff bounds, tables produced by simulations, or via the Poisson or Normal approximation. The Normal approximation applies when $ps \geq 5$ and $s(1-p) \geq 5$. The standard error is approximated by $\sqrt{\hat{p}(1-\hat{p})/s}$.

In order to define bounds for the difference of two proportions, the method uses $(1-\delta)$-confidence upper bounds for the difference of two proportions. Suppose there are $n_1$ samples from a Binomial distribution with mean $p_1$ and $n_2$ samples from a Binomial distribution with mean $p_2$. Let, $\hat{p}_1$ and $\hat{p}_2$ denote the respective sample means. The expectation of $\hat{p}_1-\hat{p}_2$ may be defined as $p_1-p_2$.

Let the notation $C(\hat{p}_1,n_1,\hat{p}_2,n_2,\delta)$ represent the $(1-\delta)$-confidence upper bound on $p_1-p_2$. The method may then apply bounds for proportions to bound the difference. It is noted that $U(n_1\hat{p}_1,n_1,\delta/2)-L(n_2\hat{p}_2,n_2,\delta/2)$ is a $(1-\delta)$-confidence upper bound on the difference $p_1-p_2$. This bound, however, is not tight. The prevailing statistical method is to use the Normal Approximation (that is based on the fact that if the two random variables are approximate Gaussians, so is their difference). The Normal approximation is applicable if $p_1n_1$, $(1-p_1)n_1$, $p_2n_2$ and $(1-p_2)n_2 > 5$. The approximate standard error on the difference estimate $\hat{p}_1-\hat{p}_2$ is $\sqrt{\hat{p}_1(1-\hat{p}_1)/n_1+\hat{p}_2(1-\hat{p}_2)/n_2}$.

In order to define cumulative confidence bounds, consider an (arbitrary) distribution on [0,1] with cumulative distribution function $F(x)$. That is, for all $0 \leq x \leq 1$, the probability of drawing a value that is at most x is $F(x)$.

For a random sample S of points from the distribution, let $\hat{F}(x)$ be the fraction of the points in S which are smaller than x. The method may then be to obtain a (simultaneous) $(1-\delta)$-confidence upper bounds for $F(b)$ for all $b \geq 0$. Observe that this is a generalization of proportion estimation: Proportion estimation is equivalent to estimating or obtaining an upper bound on a single point $p=F(a)$ without estimating $F(b)$ for all $b > 0$. The cumulative bounds considered here are derived with respect to a specific $0 \leq a \leq 1$. The method then obtains a $(1-\delta)$-confidence multiplicative error bound for $F(b)$ for all $b \geq a$.

Defining the random variable $\epsilon(a, S)$ to be $$max_{x>a} \frac{F(x) - \hat{F}(x)}{F(x)},$$

and letting $R(p,s,\delta)$ be the smallest fraction such that for every distribution $F(x)$ and a such that $F(a) \geq p$, and a random sample S of size s is drawn from F, then $\epsilon(a,S) \leq R(p,s,\delta)$ with probability $(1-\delta)$ (over the choice of S).

The cumulative $(1-\delta)$-confidence upper bound on $F(b)$ for all $b > a$ may then be defined as follows. Let $\hat{p}=\hat{F}(a)$. The method may then look for the largest q such that $q(1-R(q,s,\delta)) \leq \hat{p}$. The cumulative upper bound is $$\frac{\hat{F}(x)}{1 - R(q, s, \delta)}$$

for every $x > a$.

The method may also consider cumulative bounds that are multiplicative on $b \geq a$ and additive on $b < a$. These cumulative bounds are referred to as "cumulative+" bounds.

First, define $$\epsilon^+(a, S) = \max\left\{\epsilon(a, S), \max_{x<a} \frac{F(x) - \hat{F}(x)}{F(a)}\right\}$$

and let $R^+(p,s,\delta)$ be the smallest fraction such that for every distribution $F(\ )$ and a such that $F(a) \geq p$, and a random sample S of size s drawn from F, $\epsilon^+(a,S) \leq R(p,s,\delta)$ with probability $(1-\delta)$ (over the choice of S). The cumulative+$(1-\delta)$ confidence upper bound on $F(b)$ for all $b \geq 20$ may then be defined as follows. Let $\hat{p}=\hat{F}(a)$. The method may look for the largest q such that $q(1-R(q,s,\delta)) \leq \hat{p}$. The cumulative ++ upper bound is $$\frac{\hat{F}(x)}{1 - R(q, s, \delta)}$$

for every $x \geq a$ and $\hat{F}(x)+qR(q,s,\delta)$ for every $x \leq a$.

It is known that $R(p,s,\delta)$ and $R^+(p,s,\delta)$ are not much larger than the relative error in estimating a proportion p using s draws with confidence $(1-\delta)$. Furthermore they have the same asymptotic behavior as proportion estimates as s grows.

When estimating a proportion using basic bounds, the fraction of positive examples in the sample may be used as the estimator. The method may then determine a confidence interval for this estimate. Using the notation introduced earlier, the interval from $L(\hat{p}s,s,\delta)$ to $U(\hat{p}s,s,\delta)$ may be used as a $2\delta$ confidence interval. It is also well understood how to obtain the number of samples needed for proportion estimation within some confidence and error bounds when the proportion is at least p.

When estimating the top-k weight from samples, the method provides confidence intervals as well as the size of a fixed sample needed to answer a top-k query when the size of the top-k set is at least p.

One way of obtaining a top-k candidate is using the set of k most sampled items. The estimator for the weight of the top-k set is then the sampled weight of the sampled top-k items. This estimator, however, is inherently biased. The expectation of the sampled weight of the sample top-k is always at least as large and generally is larger than the size of the top-k set. The bias depends on the number of samples and vanishes as the number of samples grows. It also depends on the distribution. To design estimation procedures or to obtain confidence intervals for a top-k estimate the method must account for both the standard error, as in the case for proportion estimation, and also for the bias.

In order to compare Top-k and proportion estimations, let A be an algorithm that approximates the top-1 weight in a distribution with confidence $(1-\delta)$. The method may use A to derive an algorithm A' for a proportion estimation query. The accuracy of A' in estimating a proportion p is no worse than the accuracy of A on a distribution with top-1 weight equal to p.

For example, if an input to A' is a set S' of s coin flips of a coin with bias p. Algorithm A' translates S' to a sample S from a distribution D in which there is one item b of weight p and every other item has negligible small weight. The method may then generate S by replacing each positive sample in S' by a draw of b and every negative example by a draw of a different element (a unique element per each negative example). Algorithm A' applies A to S and returns the result.

The top-k problem requires computation at least as much as the top-1 problem (or as the top-i problem for i<k.). This is true for the stronger (per item) versions of the top-k problem but also holds for the top-k weight and the top-k set problems. To see this, consider a stream of samples for a top-1 problem. Label the jth sample of item i by the label $(i, U[0, \ldots, k-1])$ (where U[ . . . ] is a Uniform random selection). This is equivalent to drawing from a distribution where each item is partitioned to k same-size parts. The top-k weight in this distribution is the same as the top-1 weight in the original distribution.

Note that the reduction from top-1 to proportion is not applicable to the version of the top-1 problem where one only wants the set, without an approximation of the weight itself.

In one embodiment, the current invention provides a confidence interval based on "Naive" bounds. First, let f be the sampled weight of the sample top-k frequencies. The method then considers the distributions with the smallest top-k frequencies that are at least $\delta$ likely to have a sample distribution with top-k weight of at least f. The method then uses this frequency to obtain a lower end of a confidence interval. The confidence interval constructed may be viewed as a combination of the maximum possible bias of our top-k estimator on a distribution with the same top-k weight with standard proportion error bounds. The definition of the Naive bound requires consideration of all distributions, which is not computationally feasible. In order to calculate these bounds, the method then identifies a restricted set of distributions such that it is sufficient to consider these distributions. The method is then able to construct a pre-computed table that provides the bound according to the desired confidence level and the value f. In order to describe the method for determining the confidence intervals based on naive bounds, the bounds are first defined mathematically.

Suppose that the data/records are sampled s times and the sampled weight of the sampled top-k set is $\hat{f}$. For a given s, $\hat{f}$, k, and $\delta$, the method defines $L_k(\hat{f}s,s,\delta)$ to be the smallest f' such that there exists a distribution with top-k weight that is at most f' such that using s samples, the sampled weight of the sampled top-k set is at least $\delta$ likely to be at least f. The method similarly defines $U_k(\hat{f}s,s,\delta)$ to be the largest f' such that there is a distribution with top-k weight that is at least f' such that using s samples, the sampled weight of the sampled top-k set is at least $\delta$ likely to be at most f. It follows from the definitions that $U_k(\hat{f}s,s,\delta)$ and $L_k(\hat{f}s,s,\delta)$ are the $(1-\delta)$-confidence upper and lower bounds (respectively) on the top-k weight.

The definitions above do not provide a way to computationally obtain these bounds, since they require considering all possible distributions of items weights.

First considering the upper bound, the proportion $(1-\delta)$-confidence upper bound can be used as an upper bound on the top-k weight. That is, $$U_k(\hat{f}s,s,\delta) \leq U(\hat{f}s,s,\delta). \tag{1}$$

The above inequality (1) is an immediate corollary of the inequality (2) below and monotonicity of $U(\hat{f}s,s,\delta)$ with respect to $\hat{f}$.

The distribution function of the sampled weight of the sampled top-k dominates that of the sampled weight of the top-k set. That is, for all $\alpha > 0$, $$\text{Prob}\{\overline{W}_k(S,I) \geq \alpha\} \geq \text{Prob}\{w(S, T_k(I)) \geq \alpha\}. \tag{2}$$

In particular, $E(\overline{W}_k(S,I)) \geq \overline{W}_k(I)$. That is, the expectation of the sampled weight of the sampled top-k set is an upper bound on the actual top-k weight.

Inequality (2) may be understood by observing that the sample weight of the sample top-k is at least the sample weight of the actual top-k set (assume top-k set is unique using arbitrary tie breaking).

The method then obtains a lower bound on the top-k weight. Recall that, the definition of $L_k(\hat{f}s,s,\delta)$ was with respect to all distributions. The method then restricts the set of distributions that are to be considered. The method then computes $L_k(\hat{f}s,s,\delta)$ using simulations on the more restricted set of distributions.

Let $I_1$ and $I_2$ be two distributions. Then, $I_1$ is said to be dominating $I_2$, if for all $i \geq 1$, $\overline{W}_i(I_1) \geq \overline{W}_i(I_2)$. If $I_1$ dominates $I_2$ then the probability distribution function of the sampled weight of the sampled top-i for $I_1$ dominates that of $I_2$ as described below.

If the weighted set $I_1$ dominates $I_2$ then for any $k \geq 1$, and number of samples $s \geq 1$, the distribution function of the sampled weight of the sampled top-k with $I_1$ dominates the distribution function for $I_2$: that is, for any t, the probability that the sampled top-k would have at least t samples with $I_1$ is at least as large as with $I_2$. The above statement may be proven using an example with two distributions $I_1$ and $I_2$ that are identical except for two items $b_1$ and $b_2$.

In $I_2$, the items $b_1$ and $b_2$ have weights $w_1$ and $w_2$, respectively. In $I_1$, the items $b_1$ and $b_2$ have weights $w_1+\Delta$ and $w_2-\Delta$, respectively for some $\Delta \geq 0$. Clearly if the claim holds for $I_1$ and $I_2$ as above then it holds in general. This is true since given any two distributions $I_1$ and $I_2$ such that $I_1$ dominates $I_2$. The method can find a sequence of distributions $I_2 = I^0, I^1, \ldots, I^l = I_1$ where for every $0 \leq j < l$, $I_2^{j+1}$ is obtained from $I_2^j$ by shifting $\Delta$ weight from a smaller item to a larger one.

Consider a third distribution $I_3$ that is identical to $I_1$ and $I_2$ with respect to all items other than $b_1$ and $b_2$. The distribution $I_3$, similar to $I_1$, has an item $b_1$ with weight $w_1$, and it also has two items $b_2$ of weight $w_2-\Delta$ and $b_3$ of weight $\Delta$.

The method samples s items from $I_2$ by sampling s items from $I_3$ and considering any sample of $b_2$ or $b_3$ as a sample of $b_2$. Similarly it samples s items from $I_1$ by sampling s items from $I_3$ and considering a sample from $b_2$ as a sample of $b_2$ and a sample of either $b_1$ or $b_2$ as a sample of $b_1$.

Suppose the method samples a set S of s items from $I_3$ and maps them as above to a sample $S_1$ of s items from $I_1$ and to a sample $S_2$ of s items from $I_2$. Then, for every k and t, Prob$\{\overline{W}_k(S_1,I_1) \geq t\}$ is not smaller than Prob$\{\overline{W}_k(S_2,I_2) \geq t\}$ as shown below.

For example, the method fixes the number of samples of each item different of $b_1$, $b_2$, and $b_3$, fixes the number of samples of $b_3$ to be r, and fixes the number of samples of $b_1$ and $b_2$ together to be m. Then, the method considers only samples S of $I_3$ that satisfy these conditions. Then, the method analyzes the probability space conditioned on these choices between $b_1$ and $b_2$, where the only freedom that the method has is to split the combined m draws of $b_1$ and $b_2$. In this conditioned space, for every k and t, $\text{Prob}\{\overline{W}_k(S_1,I_1) \geq t\}$ is not smaller than $\text{Prob}\{\overline{W}_k(S_2,I_2) \geq t\}$.

Over this conditioned probability space, for a fixed $j \geq m/2$, consider the event $A_j$ where the number of samples of $b_1$ in S is j and the number of samples of $b_2$ in S is m−j. Consider also the event $A_{m-j}$ where the number of samples of $b_1$ is m−j and the number of samples of $b_2$ is j. In $A_j$ the maximum among the weights of $b_1$ and $b_2$ in $S_1$ is $\max\{j+r,m-j\}=j+r$, and the maximum among the weights of $b_1$ and $b_2$ in $S_2$ is $\max\{j, m-j+r\}$ which is smaller than j+r. On the other hand, in $A_{m-j}$ the maximum among the weights of $b_1$ and $b_2$ in $S_1$ is $\max\{m-j+r,j\}$, and the maximum among the weights of $b_1$ and $b_2$ in $S_2$ is $\max\{m-j,j+r\}=j+r$.

Consider the weight of the top-k set of $S_2$ in $A_{m-j}$, and the weight of the top-k set of $S_1$ in $A_{m-j}$. If both are at least t, then they both are at least t in $A_j$, and both $\text{Prob}\{\overline{W}_k(S_1,I_1) \geq t\}$ and $\text{Prob}\{\overline{W}_k(S_2,I_2) \geq t\}$ equal 1. However, it could be that in $A_{m-j}$ the weight of the top-k set of $S_2$ is larger than t but the weight of the top-k set in $S_1$ is smaller than t. However, if this is indeed the case in $A_{m-j}$, then in $A_j$ the weight of the top-k set of $S_1$ is larger than t but the weight of the top-k set in $S_2$ is smaller than t.

Then, let $a=b_1/(b_1+b_2-\Delta)$. Since $$\text{Prob}\{A_j\} = \binom{m}{j} a^j (1-a)^{m-j} \geq \binom{m}{m-j}(1-a)^j(a)^{m-j}$$
$$= \text{Prob}\{A_{m-j}\},$$

it follows that $\text{Prob}\{\overline{W}_k(S_1,I_1) \geq t\}$ is not smaller than $\text{Prob}\{\overline{W}_k(S_2,I_2) \geq t\}$.

The above method identifies the family of "worst-case" distributions among all distributions that have top-k weight equal to f. That is, for any threshold t and for any i, one of the distributions in this family maximizes the probability that the sampled weight of the sampled top-i exceeds t. Therefore, to find $L_k(\hat{f}s,s,\delta)$, instead of all distributions, one can consider the more restricted set of most-dominant distributions. The most-dominant distribution is determined when both the weight f of the top-k and the weight $0 < l \leq f/k$ of the kth largest item are fixed. The top-1 item in this distribution has weight $f-(k-1)l/k$, the next k−1 heaviest items have weight l, next there are $\lfloor (1-f)/l \rfloor$ items of weight l and then possibly another item of weight $1-l\lfloor (1-f)/l \rfloor$.

For example, the method may fix the weight f of the top-k items. Let $G_l$ be the most dominant distribution with value l for the kth largest item. Simulations may then be used to determine the threshold value $t_l$ so that with confidence at most $\delta$, the sampled weight of the sampled top-k in s samples from $G_l$ is at least $t_l$. The method then associates f with the value $f_m = \max_l t_l$. Clearly, $f_m$ decreases with f. The value $L_k(\hat{f}s, s, \delta)$ is the largest f such that $f_m \leq \hat{f}$. This mapping from the observed value $\hat{f}$ to the lower bound $f_m$ may be computed once and stored in a table, or may be produced when needed.

Note that for the top-1 problem, the above method provides a single "worst-case" most-dominant distribution. Since the method only needs to consider distributions where the "kth" (in this case, the top) item is f, the distribution has $\lfloor 1/f \rfloor$ items of weight f and possibly an additional item of weight $1-f\lfloor 1/f \rfloor$.

The above method described how a confidence interval may be derived for a top-k weight estimate for naive bounds. Suppose after s samples, the sampled weight of the sampled top-k set is $\hat{f}$. The method may use the estimate $(L_k(\hat{f}s,s,\delta/2)+U(\hat{f}s,s,\delta/2))/2$ with error bars of $\pm(U(\hat{f}s,s,\delta/2)-L_k(\hat{f}s,s,\delta/2))/2$. Since the two one-sided confidence intervals are not symmetric, the combined width of the error bars can be reduced by using a different confidence level for the upper and lower bounds: For $0 < \delta' < \delta$ the estimate $(L_k(\hat{f}s,s,\delta')+U(\hat{f}s,s,\delta-\delta'))/2$ can be used with error bars $\pm(U(\hat{f}s,s,\delta')-L_k(\hat{f}s,s,\delta-\delta'))/2$.

The estimate above applies to the weight of the top-k set. In order to bound the (real) weight of the sampled top-k set the method then shows $L_l(\hat{f}s,s,\delta)$ is a $(1-\delta)$-confidence lower bound on the weight of the sampled top-1 item.

First, define $L_k'(\hat{f}s,s,\delta)$, the $(1-\delta)$-confidence lower bound on the actual weight of the sampled top-k set. It is defined as the minimum, over distributions I, of the minimum value l, such that the probability is at least $\delta$ that the following combined property holds for the sampled top-k set: the sampled weight is at least $\hat{f}$, and the actual weight is at most l.

It is noted that $L_l'(\hat{f}s,s,\delta) \leq L_k(\hat{f}s,s,\delta)$. Since the set of distributions considered are restricted when calculating $L_k'$ to those with top-k weight, (that is at most 1), the method obtains $L_k(\hat{f}s,s,\delta)$. For example, for k=1, $L_l'(\hat{f}s,s,\delta)=L_l(\hat{f}s,s,\delta)$. Then, consider a distribution with items of weight larger than 1. Then, removal of these items or replacing them with items of weight smaller than 1 only increases the probability that the sampled top-k set has the combined property.

For k>1, $L_k(\hat{f}s,s,\delta)$ is a $(1-\delta)$-confidence lower bound on the weight of the sampled top-k set. This lower bound may be proven by showing: $L_k'(\hat{f}s,s,\delta)=L_k(\hat{f}s,s,\delta)$. That is, there is distribution that minimizes l that has a top-k weight that is at most 1.

The asymptotic behavior of the confidence intervals based on "naïve" bounds may also be analyzed as follows. For a given distribution l, and given $\epsilon$ and $\delta$, one can consider the smallest number of samples such that the sampled weight of the sampled top-1 item is in the interval $(1 \pm \epsilon)\overline{W}_1(I)$ with confidence $(1-\delta)$. If the method takes the maximum of this number of samples over all distributions of top-1 weight f, it obtains the smallest number of samples that suffices to answer a top-1 query for a specified $\delta$ and $\epsilon$, when the base distribution has top-1 weight at least f. The most dominant distribution with top-1 item of weight f has 1/f items of weight f. For this distribution, each of the 1/f items need to be estimated to within $(1+\epsilon)$ with confidence $1-f\delta$. Using multiplicative Chernoff bounds, the number of samples needed is obtained to be $O(f^{-1} \epsilon^{-2} (\ln \delta^{-1} + \ln f^{-1}))$. This dependence is super linear in $f^{-1}$. This can be contrasted with the number of samples needed to estimate a proportion of value at least p, for a given $\epsilon$, $\delta$, and p. From Chernoff bounds, $O(p^{-1} \epsilon^{-2} (\ln \delta^{-1}))$, which is linear in $p^{-1}$.

The naive bounds are derived under "worst-case" assumptions on the distribution, and therefore subjected to the $O(f^{-1} \epsilon^{-2} (\ln \delta^{-1} + \ln f^{-1}))$ dependence. A distribution where all items other than the top-1 are tiny behaves like a proportion and a good estimate of the top-1 weight is obtained after $O(f^{-1} \epsilon^{-2} \ln \delta^{-1})$ samples. Some distributions, e.g., Zipf-like distributions, have asymptotic behavior that is closer to proportion estimation when the distribution is more skewed. This behavior indicates that the Naive bounds provide a pessimistic lower bound that also exhibits worse asymptotic behavior than one would hope to obtain for some distributions. In one embodiment, the current invention provides tighter bounds (e.g., cumulative upper bounds) by exploiting more information on the distribution.

In one embodiment, the current invention uses the sample distribution to construct a cumulative upper bound (CUB) for the top-i weight for all $i \geq 1$. The method then uses the CUB to restrict the set of distributions that are to be taken into account in the lower bound construction.

The derivation of CUB bound resembles that of the Naive bound. As with the Naive bound, the method determines the distribution with the smallest top-k weight that is at least $\delta$ likely to have sampled top-k weight that "matches the sample." The difference is that in addition to using the sampled top-k weight, the CUB bound uses statistics on the sample to further restrict the set of distributions to be considered. By doing this, the method is able to tighten the bound. The CUB bound is derived in two steps (for $\delta' \leq \delta$). First the cumulative upper bound is derived then the lower bound is derived.

To derive the cumulative upper bound, the method obtains $(1-\delta')$-confidence cumulative upper bound on the weight of $\overline{W}_i(I)$ for all $i \geq 0$. The method then obtains $R_1 \leq \ldots \leq R_{k+1} \leq \ldots$ such that for all $i \geq 1$, $R_i$ is an upper bound on the top-i weight.

To derive the lower bound, the method obtains a $(1-(\delta-\delta'))$ confidence lower bound $L_k'(\{R_i\}, \hat{f}s, s, \delta-\delta')$ as follows. First, the method considers all distributions that are consistent with the obtained CUB, that is, J such that $\overline{W}_i(J) \leq R_i$ for all ($i \geq 0$). Then, the method searches for the distribution J with smallest top-k weight $\overline{W}_k(J)$ that is at least $(\delta-\delta')$ likely to have a sampled top-k weight of at least $\overline{W}_k(S,I)$. The lower bound is then set to $\overline{W}_k(J)$.

Correctness is immediate. For example, if one considers a distribution, the probability that the cumulative upper bound that is obtained for the distribution fails is at most $\delta'$. If the distribution obeys the cumulative upper bound, then the probability that the lower bound derived in the second step is incorrect is at most $(\delta-\delta')$. Therefore, for any distribution, the probability that it does not lie in its confidence interval is at most $\delta$.

The method may then derive a $(1-\delta)$ confidence lower bound $L_k'(\{R_i\}, \hat{f}s, s, \delta)$ on the top-k weight as follows. (The Naive bound is $L_k(\hat{f}s, s, \delta) \equiv L_k(\{1,1,1,\ldots,\}, \hat{f}s, s, \delta)$.) Similarly to the Naive bound, the method restricts the set of distributions considered for the lower bound derivation by only considering the representative set of most dominant distributions. As is the case for the Naive bounds, the most dominant distributions that conform to $\{R_i\}$ upper bounds are determined once the method fixes the top-k weight f and the weight $l > f/k$ of the kth heaviest item. For $i > k$, the weight of the ith item is as large as possible given that it is no larger than the $(i-1)$th item and that the sum of the top-i items is at most $R_i$. If $R_i$ for $i < k$ are not restricted ($R_1 = R_2 = \ldots = R_{k-1} = 1$), then the k-heaviest items are as in the naive bounds. The top-1 weight is $f - (k-1)l$ and the next $k-1$ heaviest items have weight l. Otherwise, each of the first k items has weight at least l, with as much weight as possible placed on earlier items.

Formally, let $1 \leq j \leq k$ be the minimum such that $$\sum_{h=1}^{j} R_h + (k-j)l \geq f.$$

The most dominant distribution is such that the top j−1 items have weights $R_1, \ldots, R_{j-1}$; the items $j+1, \ldots k$ have weight l; and the jth item has weight $$f - \sum_{h=1}^{j-1} R_j - (k-j)l.$$

The method may then use simulations on these most-dominant distributions to determine the probability that the sampled weight of the sampled top-k matches or exceeds the observed one. Since there are many parameters in the upper bound ($\{R_i\}$ for $i \geq 1$), the method does not use a pre-computed table for the lower bound $L_k'(\{R_i\}, \hat{f}s, s, \delta)$). Therefore, the CUB bounds are more computationally intensive than the Naive bounds.

The confidence interval obtained applies to the weight $\overline{W}_k(I)$ of the top-k set. Using similar arguments to the naive derivation, for k=1, the confidence interval applies also to the actual weight of the sampled top-1 set. It also applies to the actual weight of the set $I_k$ when $k > 1$.

In one embodiment, the current invention provides confidence intervals based on cross validation methods. In cross validation method, the sample is split into two parts: one part for "learning" and the other for "testing." The method obtains the sampled top-k set from the learning part. The method then examines the sampled weight of that set in the testing part to obtain a "lower end" for the confidence interval. That means, the method computes the sampled top-k set from the learning part, and estimates its weight using the testing part. Since the learning and testing parts are independent, the expectation of the sample weight of that set in the testing part is equal to its actual weight, which is at most the top-k weight. The method then applies proportion bounds to obtain a $((1-\delta)$-confidence) lower bound on the top-k weight. The method may also consider "validation estimators" that are biased to be lower than the top-k weight. These estimators offer an alternative to the positively biased estimator that corresponds to the top-k frequencies in the sample.

The distribution of the sampled weight of any particular size-k subset is dominated by the sample weight distribution of the top-k set. Note that, any fixed k-subset has weight at most that of the top-k. Hence, just like the case of applying proportion upper bounds to the estimate that is biased upwards, the application of proportion lower bounds to validation estimators is pessimistic in that it is applied to a quantity that its expectation is below that of the top-k weight. Proportion bounds are calculated to be correct for unbiased quantities. Therefore, the fraction of runs on which the estimate is incorrect is expected to be lower than the corresponding value, especially for smaller number of samples when the bias is larger.

In one embodiment, the current invention splits the samples for the cross validation method in various ways. In one embodiment, the method provides a "split-sample validation" for which it obtains error bars using proportion bounds. This method allows obtaining a top-k candidate and obtaining a lower bound on its actual weight.

The statistics literature shows that extensions on this validation method, that are referred to as cross validation exhibit better performance in the hypothesis testing context. The method then obtains top-k estimators from analogous cross-validation methods: the f-fold cross validation and the leave-$m_l$-out cross validation. These estimates allow deriving the lower bounds on the top-k weight. The expectation of these estimators is equal to the expectation of the actual weight of a sampled top-k set obtained in a sample of size equal to that of the learning sample. For a larger learning set, the expectation is higher and closer to the top-k weight, and therefore allows for tighter bound. On the other hand, the variance of the estimate depends on the size of the testing set and the cross validation method.

The tradeoffs and the derivations of the cross-validation based confidence intervals are described below. The derivation of the upper bounds on the difference between the weight of the candidate set to that of the actual top-k set is also described. That is, the method upper bounds the potential increase in weight by exchanging items in the candidate set with items outside it. A variant of the split-sample validation method is then applied to directly bound this difference.

For the Split-sample (hold out) Validation, the learning sample is denoted by $S_u$ and the testing sample is denoted by $S_l$ and their respective sizes are denoted by $m_u$ and $m_l$. Then, $m_u=m_l=s/2$. The sampled top-k set in the learning sample, $I_{k,u}=T_k(S_u,I)$, is the top-k candidate and its sampled weight $w(S_u,I_{k,u})$ in the learning sample is a sample from a quantity that upper bounds $\overline{W}_k(I)$ and hence used to derive an upper bound on the top-k weight. The sampled weight of $I_{k,u}$ in the testing sample is used to derive a lower bound. Since $S_l$ is independent of $S_u$, the expectation of the sampled weight of $I_{k,u}$ in $S_l$ is the actual weight of $I_{k,u}$. In fact, the distribution of $w(S_l,I_{k,u})$ is a Binomial random variable of sampling a proportion $w(I_{k,u})$ $m_l$ times. Since $w(I_{k,u}) \leq \overline{W}_k(I)$, the expectation of the estimator is a lower bound on $\overline{W}_k(I)$. When computing error bars, both $w(S_u,I_{k,u})$ and $w(S_l,I_{k,u})$ can be treated as proportion samples from proportions that are at least and at most the top-k weight, respectively.

For the upper bound the method can use $U(\delta)=U(m_u w(S_u, I_{k,u}),m_u,\delta)$ or the generally tighter upper bound derived from the complete sample $U(\delta)=U(mw(S,I_k),m,\delta)$. For the lower bound the method can use $L(\delta)=L(m_l w(S_l,I_{k,u}),ml,\delta)$. Then, $(U(\delta/2)+L(\delta/2))/2$ is the top-k weight estimate. The error bars are $\pm(U(\delta/2)-L(\delta/2))/2$. Note that the estimate is valid not only for the top-k weight but also for the actual weight of the set $I_{k,u}$.

For r-fold Cross Validation, first examine the 2-fold case. In 2-fold ("double") cross validation the sample is again split into two equal parts $S_U$ and $S_l$. The method then computes the sampled top-k sets in both $S_U$ and $S_l$. Then, denote the two sets by $I_{k,u}$ and $I_{k,l}$. Denote the sampled top-k set in the full sample by $I_k$. For the lower bound the method uses $L(\delta)=L((mlw(S_l,I_{k,u})+m_u w(S_u,I_{k,l}))/2,s/2,\delta)$. This is a $(1-\delta)$-confidence lower bound on the top-k weight. The $s=m_u+m_l$ samples are taken from two different proportions, but both these proportions are at most the top-k weight. The expectation of this 2-fold estimate is the same as for the split sample estimator, but the motivation for introducing this refinement is that the method reduces the variance by averaging over two sets. This bound is also applicable to the weight of the set $I_k$. $L(\delta)$ is a $(1-\delta)$-confidence lower bound on the weight of the set $I_k$.

This approach can be extended to r-fold cross validation where the sample is split into r equal parts. For each part, the method computes the sampled top-k set on the learning set that contains the other $r-1$ parts and then computes its weight on the held-out part. The method then denotes the r-fold cross validation estimate by $X_r$. For any r, $E(X_r) \leq \overline{W}_k(I)$.

The above may be demonstrated as follows. For each part, the method has $s/r$ independent samples from a proportion that is the actual weight of some k-subset (therefore is at most the top-k weight). The proof follows from linearity of expectation. Note that there is dependence between different parts. As noted above, the expectation of $X_r$ is equal to the expectation of the actual weight of a sampled top-k set obtained using $(1-1/r)s$ samples.

The method may also use leave-out cross validation bounds. Leave-ml-out cross validation is a "smoothed" version of r-fold cross validation. Consider some fixed $k \leq m_u \leq m-1$. The estimator $J_{m_u}$ is the average, over all subsets $S_u \subset S$ of size $|S_u|=m_u$, of the sampled weight in $S_l=S\setminus S_u$ of the sampled top-k subset in $S_u$. When there are multiple items with kth largest number of samples, the method emulates uniform at random selection among them to determine which ones are included in the sampled top-k set. This selection is also factored into the estimators by averaging over all selections. The leave-out estimators perform better than the r-fold estimators since the variance of $J_{m_u}$ is at most that of $X_r$ with $r=s/ml$. For all $m_u$, $E(J_{m_u}) \leq \overline{W}_k(I)$. The proof is shown below.

Consider a particular size-$m_u$ subset of the sample specified by its positions in the sample. The sampled weight in $S_l=S\setminus S_u$ of the sampled top-k subset in $S_u$ is equivalent to taking $|S_l|$ independent samples from a proportion equal to the weight of the sampled top-k set in $S_u$, which by definition is at most $\overline{W}_k(I)$. The proof follows by linearity of expectation. The expectation of the estimator $J_{m_u}$ is equal to the expectation of the actual weight of the sampled top-k set in a sample of size $m_u$.

As the leave-out estimators are defined over all possible subsets, direct computation can be prohibitive. The following relationship provides us with a computationally easy way to obtain approximate values for the leave-out estimators. For a multiset S, integer k, and item id i, let $P(i,k,m,S)$ be the probability that i is in the top-k items in a random m-size subset of S. The method accounts for "partial fit" in the definition of $P(i,k,m,S)$. Consider some subset of S of size m. If the count of i exceeds that of the kth most frequent item, the contribution is 1. If it is strictly lower than the frequency of the kth most frequent item in the subset then the contribution is 0. Otherwise, let b be the total number of items with frequency equal to that of the kth most frequent item, and let c be the number of such items in the top-k set. The contribution is then c/b. $P(i,k,m,S)$ is the average of these contributions over all possible mr-subsets of S.

Then, let i be the id of the ith most common item in S and let $a_i$ be its number of occurrences. For any $m_u$, $$J_{m_u} = \sum_i a_i P(i, k, m_u, S \setminus \{i\})$$

To estimate $J_{m_u}$ the method uses subsets of size $m_u+1$ from S. From each sample, the method can compute a contribution to $P(i,k,m_u,S\setminus\{i\})$ for all i by carefully accounting for the occurrences of item with index id i.

For example, for leave-1-out, the leave-1-out and the s-fold estimators are the same. This estimator can be efficiently computed from the sample counts of items. Consider a sample and let $a_1 \geq a_2 \geq a_3 \ldots$ be the sampled counts of items. Let $t_{k+1} \geq 1$ be the number of items with frequency equal to $a_{k+1}$. Let $n(t_{k+1}-1 \geq n \geq 0)$ be the number of such items in the sampled top-k set. The estimate is $$X_s \equiv J_{s-1} = \left(\frac{1}{s}\right)\left(\sum_{i|a_i-1>a_{k+1}} a_i + \left(\frac{n+1}{t_{k+1}+1}\right)\sum_{i|a_i-1=a_{k+1}} a_i\right).$$

The first terms account for the contribution of items that definitely remain in the modified top-k set after "loosing" the leave-out sample. This includes all items that their count in the sample is larger than $a_{k+1}+1$. The second term accounts for items that are "partially" in the top-k set after loosing the leave-out sample. Partially means that there are more items with that frequency than spots for them in the new top-k set. The hypothesis testing literature indicates that leave-1-out cross validation performs well but has the disadvantage of being computationally intensive. In the current setting, the computation of the estimator is immediate from the sampled frequencies. This estimator has a maximal size learning set, of size $s-1$, and therefore its expectation is closest to the top-k weight among all the cross validation estimators.

The choice of the particular cross validation estimator, selecting r for the r-fold estimators or $m_u$ for the leave-out estimators reflects the following tradeoffs. The expectation of these estimators is the expectation of the actual weight of the sampled top-k set in a sample of the size of the learning set. This expectation is non-decreasing with the number of samples and gets closer to $\overline{W}_k(I)$ with more samples in the learning set. Moreover, the distribution of the sampled top-k weight with fewer samples dominates that taken with more samples. Therefore, it is beneficial to use larger learning sets. (larger r or smaller $m_u$). In the extreme, the leave-1-out estimator is the one that maximizes the expectation of the estimator. However, smaller size test sets and dependencies between learning sets can increase the variance of the estimator. The effect of that on the derived lower bound depends on both the actual variance and on how tightly we can bound this variance. The current method considers both the empirical performance of these estimators and the rigorous confidence intervals that can be derived for them.

As was done for the 2-fold estimator, proportion lower bounds can be applied to the cross validation estimators as follows: The method treats the estimate as a Binomial random variable with $m_u$ (or s/r) independent samples. This computation is pessimistic from two reasons. The first is the application of a proportion bound to a biased quantity. The second reason is that the calculation assumes a binomial distribution with s/r independent trials, and therefore does not account for the benefit of the cross validation averaging over multiple test sets. These effect worsens for larger values of r. For confidence intervals, the method uses two approaches to derive lower bounds. The first is the pessimistic rigorous approach. The second is a heuristic that "treats" the estimate as a binomial with s independent trials and applies a proportion $L(sX_r, s, \delta)$ lower bound. This heuristic is referred to as r-fold.

Next consider the goal of obtaining a $(1-\delta)$-confidence upper bound on the difference $\overline{W}_k(I) - w(I_{k,u})$ between the weight of the output set $I_{k,u}$ to that of the true top-k set.

A more refined question is "by how much can one possibly increase the weight of the set by exchanging items from $I_{k,u}$ with items that are in $I \backslash I_{k,u}$?" It is a different question than bounding the weight of the set. For example, in some cases "the result is 95% certain that the set is the (exact) top-k set." which is something one can not conclude from confidence bounds on the weight.

The method uses the basic split-sample validation approach, where the top-k candidate set, $I_{k,u}$, is derived from the learning sample $S_u$. The testing sample $S_l$ is then used to bound the amount by which one can increase the weight of the set $I_{k,u}$ by exchanging a set of items from $I_{k,u}$ with a set of items of the same cardinality from $I \backslash I_{k,u}$.

Denote by $J_i = T_i(S_l, I \backslash I_{k,u})$ $(1 \le i \le k)$ the sampled top-i items in $I \backslash I_{k,u}$ using samples $S_l$. Denote by $H_j = B_j(S_l, I_{k,u})$ the sampled bottom-j items in $I_{k,u}$ using samples $S_l$. Let $C_j \equiv C(w(S_l, J_j), m_l, w(S_l, H_j), m_l, \delta)$ ($C_j$ is a $(1-\delta)$-confidence upper bound on the difference of two proportions applied to $w(S_l, J_j)$ and $w(S_l, H_j)$ with sample size $m_l$).

Then, $\max_{1 \le j \le k} C_j$ is a $(1-\delta)$-confidence upper bound on the amount by which one can increase the weight of the set $I_{k,u}$ by exchanging items. (Hence, it is also a $(1-\delta)$-confidence upper bound on the difference $\overline{W}_k(I) - w(I_{k,u})$). This may be shown as follows.

The maximal amount by which one can increase the weight of $I_{k,u}$ by exchanging items is equal to $$\max_{1 \le j \le k} \overline{W}_j(I \backslash I_{k,u}) - \underline{W}_j(I_{k,u}).$$

It follows that if $C_j$ is a $(1-\delta)$-confidence upper bound on the difference $\overline{W}_j(I \backslash I_{k,u}) - \underline{W}_j(I_{k,u})$, then $\max_{1 \le j \le k} C_j$ is a $(1-\delta)$-confidence upper bound on the maximum increase (and therefore on the difference $\overline{W}_k(I) - w(I_{k,u})$).

It remains to show that $C_j$ is a $(1-\delta)$-confidence upper bound on $\overline{W}_j(I \backslash I_{k,u}) - \underline{W}_j(I_{k,u})$. The method then uses the samples $S_l$ to obtain upper bound on the weight of the top-i elements in $I \backslash I_{k,u}$ and lower bound on the weight of the bottom-i elements in $I_{k,u}$. By definition, $w(H_j) \ge \underline{W}_j(I_{k,u})$, and therefore $w(S_l, H_j) = \underline{W}_j(S_l, I_{k,u})$ is a sample from a proportion that is at least $\underline{W}_j(I_{k,u})$. Similarly, $w(J_i) \le \overline{W}_j(I \backslash I_{k,u})$, and therefore $w(S_l, J_j)$ is a sample from a proportion that is at most $\overline{W}_j(I \backslash I_{k,u})$. Therefore, $C_j$ is also a $(1-\delta)$-confidence upper bound on the difference $\overline{W}_j(I \backslash I_{k,u}) - \underline{W}_j(I_{k,u})$.

Figure 2:
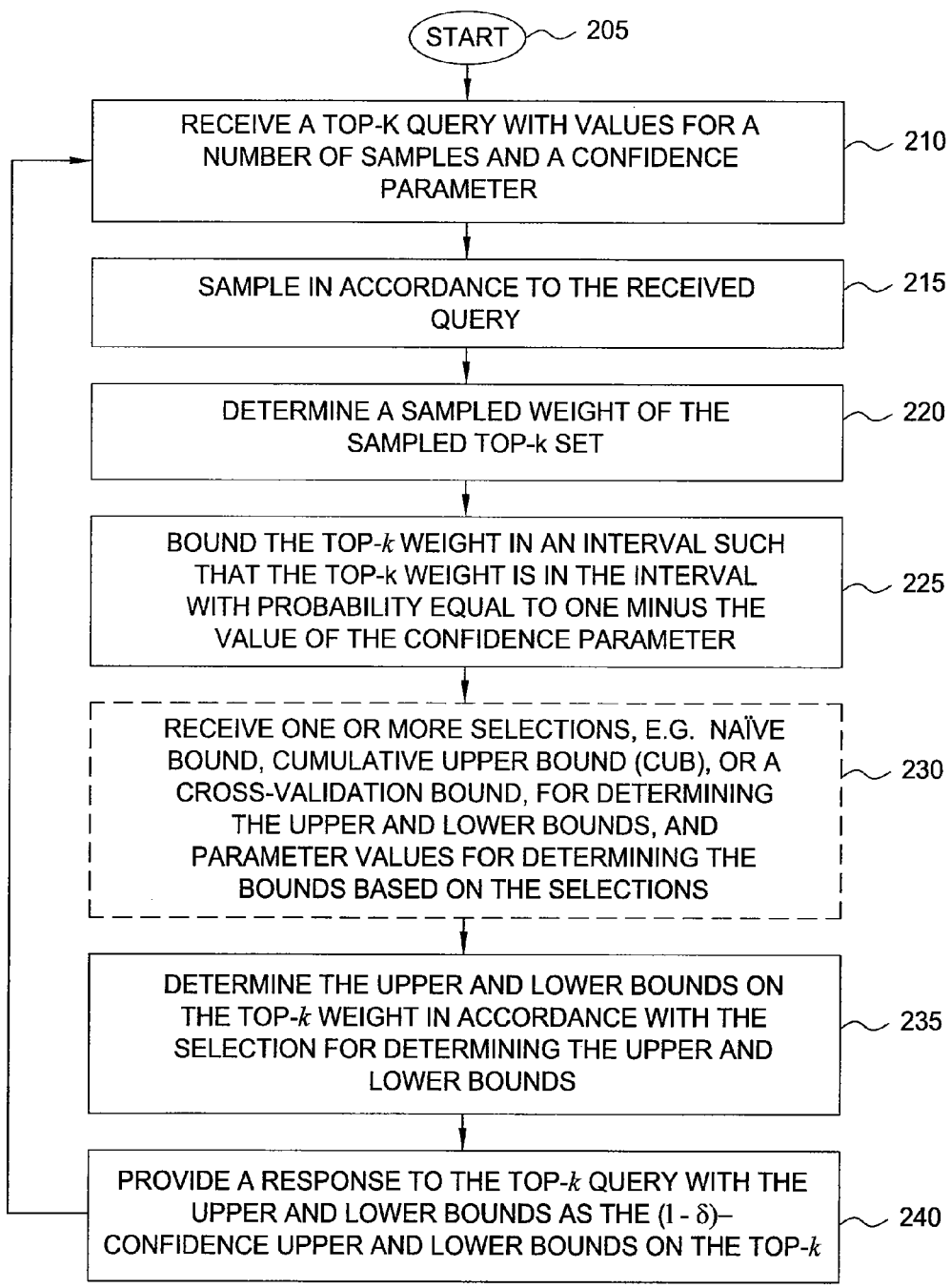
FIG. 2 illustrates a flowchart of a method for providing processing of Top-k queries from samples.

FIG. 2 illustrates a flowchart of a method 200 for providing processing of top-k queries from samples. Method 200 starts with step 205 and proceeds to step 210.

In step 210, method 200 receives a top-k query with values for a number of samples and a confidence parameter. For example, the method receives a request to provide a top-k estimate based on a specific number of samples and a value for a confidence parameter. For example, the request may be to provide a top-10 estimate based on sampling a 1000 times and confidence parameter equal to 0.05. That is, s=1000, k=10, and $\delta=0.05$.

In step 215, method 200 samples in accordance to the received request. For the example above, the method samples 1000 times.

In step 220, method 200 determines a sampled weight of the sampled top-k set. For example, the method determines $\hat{f}$, the sample weight of the sampled top-k set. For the example above, the method determines the sample weight of the sampled top-10 set.

In step 225, method 200 bounds the top-k weight in an interval such that the top-k weight is in the interval with probability equal to one minus the value of the confidence parameter.

For example, define bound the top-k weight in interval $[L_k(\hat{f}, s, \delta), U_k(\hat{f}, s, \delta)]$ such that the top-k weight is in the interval with probability $(1-\delta)$, wherein: $L_k(\hat{f}, s, \delta)$ is the smallest f' such that there exists a distribution with top-k weight that is at most f' such that using s samples, the sampled weight of the sampled top-k set is at least $\delta$ likely to be at least $\hat{f}$; and $U_k(\hat{f}, s, \delta)$ is the largest f' such that there is a distribution with top-k weight that is at least f' such that using s samples, the sampled weight of the sampled top-k set is at least $\delta$ likely to be at most f. For example, the method defines $U_k(\hat{f}, s, \delta)$ and $L_k(\hat{f}, s, \delta)$) as the $(1-\delta)$-confidence upper and lower bounds (respectively) on the top-k weight for said s, $\hat{f}$, k, and $\delta$.

In optional step 230, method 200 receives one or more selections for determining the upper and lower bounds, and parameter values for determining the bounds based on said selections. For example, a user may select the upper and lower bounds to be determined based on Naïve bound, Cumulative Upper Bound (CUB), or a cross-validation bound wherein said cross-validation bound is a split-sample cross validation bound, an r-fold cross validation bound, or a leave-out cross validation bound. If a user selected the upper and lower bounds to be determined based on Cumulative Upper Bound (CUB), the method receives a value for confidence parameter $\delta'$, wherein $\delta' \le \delta$. If a user selected the upper and lower bounds to be determined based on an r-fold cross validation, the method receives a value for r.

In one embodiment, method 200 provides a default selection for determining the upper and lower bounds. For example, method 200 may assume the user selection to be based on Naive bounds unless the user specifically requests another type of bound.

In step 235, method 200 determines the upper and lower bounds on the top-k weight in accordance with the selection for determining the upper and lower bounds.

In one embodiment, the user selects the upper and lower bounds to be determined based on Naïve bounds. If the user selects naïve bounds, the method computes the upper bounds from a proportion $(1-\delta)$-confidence upper bound using $U_k(\hat{fs}, s, \delta) \leq U(\hat{fs}, s, \delta)$ as shown in equation (1). The method then restricts the set of distributions that are to be considered and computes $L_k(\hat{fs}, s, \delta)$ using simulations on the more restricted set of distributions.

For example, the method may fix the weight f of the top-k items. Let $G_l$ be the most dominant distribution with value 1 for the kth largest item. Simulations may then be used to determine a threshold value $t_l$ such that with confidence at most $\delta$, the sampled weight of the sampled top-k in s samples from $G_l$ is at least $t_l$. The method then associates f with the value $f_m = \max_l t_l$. The value $L_k(\hat{fs}, s, \delta)$ is then the largest weight f of the top-k items such that $f_m \leq f$. In one embodiment, this mapping from the observed value $\hat{f}$ to the lower bound $f_m$ is computed once and stored in a table. In another embodiment, the mapping from the observed value $\hat{f}$ to the lower bound $f_m$ is computed when needed.

In one embodiment, the user selects the upper and lower bounds to be determined based on Cumulative Upper Bound (CUB). For example, the method determines the distribution with the smallest top-k weight that is at least $\delta$ likely to have sampled top-k weight that matches the sample and further restricts the set of distributions to be considered by using the statistics on the sample.

To derive the cumulative upper bound, the method then obtains $(1-\delta')$-confidence cumulative upper bound on the weight of $\overline{W}_i(I)$ for all $i \geq 0$, wherein $\delta' \leq \delta$. The method then obtains $R_1 \leq \ldots \leq R_{k+1} \leq \ldots$ such that for all $i \geq 1$, $R_1$ is an upper bound on the top-i weight.

To derive the lower bound, the method obtains a $(1-(\delta-\delta'))$ confidence lower bound $L_k'(\{R_i\}, \hat{fs}, s, \delta-\delta')$ as follows. First, the method considers all distributions that are consistent with the obtained CUB, that is, J such that $\overline{W}_i(J) \leq R_i$ for all $(i \geq 0)$. Then, the method searches for the distribution J with smallest top-k weight $\overline{W}_k(J)$ that is at least $(\delta-\delta')$ likely to have a sampled top-k weight of at least $\overline{W}_k(S, I)$. The lower bound is then set to $W_k(J)$.

In one embodiment, the user selects the upper and lower bounds to be determined based on cross-validation bounds. For example, the method splits the samples into 2 parts for split-sample cross validation or r parts for r-fold cross validation. The method then learns on a portion of the sample to obtain tighter bounds for the other portion.

In step 240, the method provides a response to said top-k query with said upper and lower bounds as the $(1-\delta)$-confidence upper and lower bounds on the top-k weight. The method then returns to step 210 to continue receiving top-k queries.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
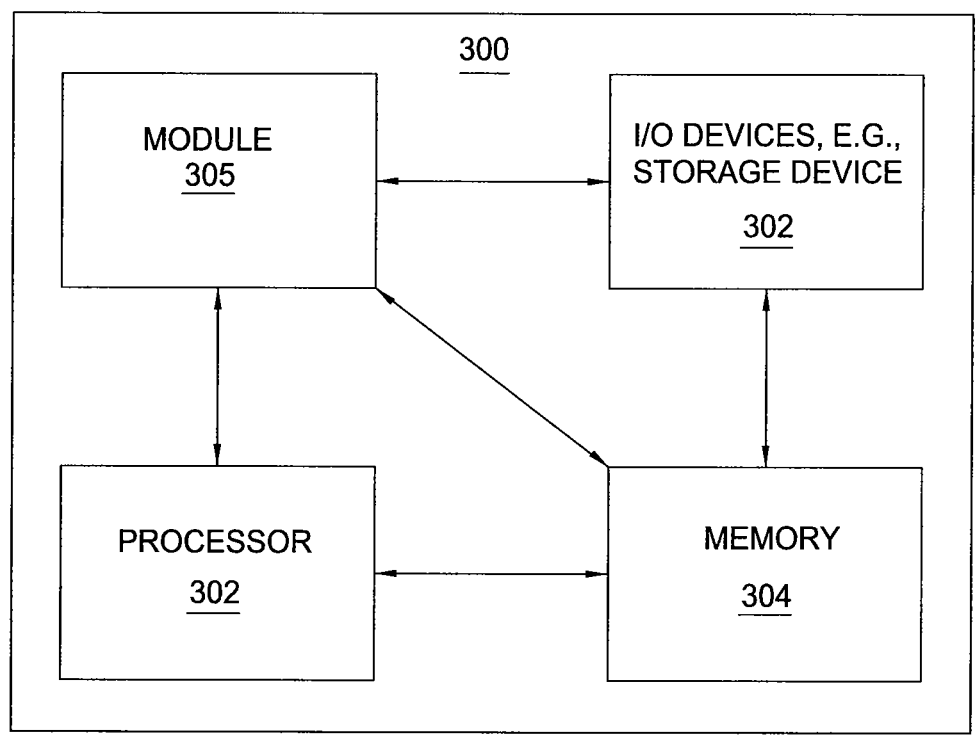
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing processing of top-k queries from samples, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing processing of top-k queries from samples can be loaded into memory 304 and executed by processor 302 to implement the functions as discussed above. As such, the present method 305 for providing processing of top-k queries from samples (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a top-k query, comprising:
   receiving, by a processor of an application server operated by a service provider of a core internet protocol network, the top-k query with a value for a number of samples and a value of a confidence parameter, wherein the top-k query is received from a user endpoint device;
   sampling, by the processor of the application server, in accordance to the number of samples;
   determining, by the processor of the application server, a top-k weight of a sample top-k set;
   bounding, by the processor of the application server, the top-k weight in an interval having an upper bound and a lower bound where the top-k weight is in the interval with a probability equal to one minus the value of the confidence parameter; and
   providing, by the processor of the application server, a response to the top-k query in accordance with the upper and lower bounds.

2. The method of claim 1, further comprising:
   receiving a selection for determining the upper bound and the lower bound for the interval, and a parameter value for determining the upper bound and the lower bound based on the selection; and
   determining the upper bound and the lower bound on the top-k weight in accordance with the selection for determining the upper bound and the lower bound.

3. The method of claim 1, wherein the upper bound and the lower bound are based on Naïve bounds.

4. The method of claim 1, wherein the upper bound and the lower bound are based on cumulative upper bounds.

5. The method of claim 1, wherein the upper bound and the lower bound are based on a cross-validation bound.

6. The method of claim 5, wherein the cross-validation bound is a split-sample cross-validation bound.

7. The method of claim 5, wherein the cross-validation bound is a r-fold cross validation bound.

8. The method of claim 5, wherein the cross-validation bound is a leave-out cross validation bound.

9. A non-transitory computer-readable medium storing a plurality of instructions which, when executed by a processor of an application server, cause the processor to perform operations for processing a top-k query, the operations comprising:
- receiving the top-k query with a value for a number of samples and a value of a confidence parameter, wherein the top-k query is received from a user endpoint device, wherein the application server is operated by a service provider of a core internet protocol network;
- sampling in accordance to the number of samples;
- determining a top-k weight of a sample top-k set;
- bounding the top-k weight in an interval having an upper bound and a lower bound where the top-k weight is in the interval with a probability equal to one minus the value of the confidence parameter; and
- providing a response to the top-k query in accordance with the upper and lower bounds.

10. The non-transitory computer-readable medium of claim 9, further comprising:
- receiving a selection for determining the upper bound and the lower bound for the interval, and a parameter values for determining the upper bound and the lower bound based on the selection; and
- determining the upper bound and the lower bound on the top-k weight in accordance with the selection for determining the upper bound and the lower bound.

11. The non-transitory computer-readable medium of claim 9, wherein the upper bound and the lower bound are based on Naïve bounds.

12. The non-transitory computer-readable medium of claim 9, wherein the upper bound and the lower bound are based on cumulative upper bounds.

13. The non-transitory computer-readable medium of claim 9, wherein the upper bound and the lower bound are based on a cross-validation bound.

14. The non-transitory computer-readable medium of claim 13, wherein the cross-validation bound is a split-sample cross-validation bound.

15. The non-transitory computer-readable medium of claim 13, wherein the cross-validation bound is a r-fold cross validation bound.

16. The non-transitory computer-readable medium of claim 13, wherein the cross-validation bound is a leave-out cross validation bound.

17. An apparatus for processing a top-k query, comprising:
- an application server comprising a processor; and
- a computer-readable medium storing a plurality of instructions which, when executed by the processor, cause the processor to perform operations, the operations comprising:
  - receiving the top-k query with a value for a number of samples and a value of a confidence parameter, wherein the top-k query is received from a user endpoint device;
  - sampling in accordance to the number of samples;
  - determining a top-k weight of a sample top-k set;
  - bounding the top-k weight in an interval having an upper bound and a lower bound where the top-k weight is in the interval with a probability equal to one minus the value of the confidence parameter; and
  - providing a response to the top-k query in accordance with the upper and lower bounds, wherein the application server is operated by a service provider of a core internet protocol network.

18. The apparatus of claim 17, further comprising:
- receiving a selection for determining the upper bound and the lower bound for the interval, and a parameter value for determining the upper bound and the lower bound based on the selection; and
- determining the upper bound and the lower bound on the top-k weight in accordance with the selection for determining the upper bound and the lower bound.

19. The apparatus of claim 17, wherein the upper bound and the lower bound are based on a cross-validation bound.

20. The apparatus of claim 19, wherein the cross-validation bound is a r-fold cross validation bound.

* * * * *